(12) United States Patent
Boussaad et al.

(10) Patent No.: US 8,668,980 B2
(45) Date of Patent: *Mar. 11, 2014

(54) FILLED POLYIMIDE FILMS AND COVERLAYS COMPRISING SUCH FILMS

(75) Inventors: Salah Boussaad, Wilmington, DE (US); Gloria T. Worrell, New Castle, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 471 days.

This patent is subject to a terminal disclaimer.

(21) Appl. No.: 12/961,562

(22) Filed: Dec. 7, 2010

(65) Prior Publication Data

US 2012/0141759 A1 Jun. 7, 2012

(51) Int. Cl.
*B32B 7/02* (2006.01)
(52) U.S. Cl.
USPC ..... 428/212; 428/220; 428/304.4; 428/319.9; 106/122; 52/50; 52/189
(58) Field of Classification Search
USPC ............ 428/212, 220, 304.4–319.9; 106/122; 52/50–189
See application file for complete search history.

(56) References Cited

U.S. PATENT DOCUMENTS

| | | | |
|---|---|---|---|
| 3,883,452 A | | 5/1975 | Scheuerlein et al. |
| 4,576,862 A | * | 3/1986 | Lee et al. ................ 428/317.7 |
| 4,770,931 A | | 9/1988 | Pollock et al. |
| 5,776,990 A | | 7/1998 | Hedrick et al. |
| 6,107,357 A | | 8/2000 | Hawker et al. |
| 6,387,969 B1 | * | 5/2002 | Yamamoto et al. ............ 521/61 |
| 6,426,372 B1 | | 7/2002 | Minami et al. |
| 6,541,865 B2 | | 4/2003 | Hawker et al. |
| 7,273,894 B2 | | 9/2007 | Shelby et al. |
| 7,658,989 B2 | | 2/2010 | DeSimone et al. |
| 2003/0013042 A1 | * | 1/2003 | Brabbs et al. ............ 430/271.1 |
| 2004/0099374 A1 | * | 5/2004 | Kanakarajan ............ 156/345.1 |
| 2007/0004813 A1 | | 1/2007 | Shelby et al. |
| 2008/0152881 A1 | | 6/2008 | Gannett |
| 2008/0188578 A1 | | 8/2008 | Hawker et al. |

FOREIGN PATENT DOCUMENTS

EP 1260991 A1 11/2002

OTHER PUBLICATIONS

International Patent Application No. PCT/US10/57379, Meredith Dunbar, filed Nov. 19, 2010.
U.S. Appl. No. 12/980,434, Dennis Gerard Madeleine, filed Dec. 29, 2010.
Co-Pending U.S. Appl. No. 12/296,522, Salah Boussaad, filed Dec. 7, 2010.
Co-Pending U.S. Appl. No. 12/961,557, Salah Boussaad, filed Dec. 7, 2010.
Co-Pending U.S. Appl. No. 12/961,524, Salah Boussaad, filed Dec. 7, 2010.
Co-Pending U.S. Appl. No. 12/961,525, Salah Boussaad, filed Dec. 7, 2010.
Anonymous Disclosure, Research Disclosure 34888, Polyacrylonitrile as a High Temperature Dye for Use as an Anti-Reflectivity Coat, Undated.
S. K. Kurmvanshi et al., Pan Based Quasi Carbon Whiskers Reinforced Pi Polyblends: Microhardness, Mechanical, Hydraulic, and Morphological Study, Polymer Engineering and Science (2008), pp. 505-510.
A. Nagendran et al., Cellulose Acetate and Polyetherimide Blend Ultrafiltration Membranes, I: Preparation, Characterization, and Application, Materials and Manufacturing Processes, vol. 23 (2008), pp. 311-319.

\* cited by examiner

*Primary Examiner* — Aaron S Austin
*Assistant Examiner* — Lawrence Ferguson

(57) ABSTRACT

The present disclosure relates generally to filled polyimides that can be used in films and articles comprising the films. The films are useful in coverlay applications and have advantageous optical properties. The present disclosure also relates to blends of polyimide precursor, polyacrylonitrile, and cellulosic polymer which can be used to obtain the filled polyimides.

15 Claims, 6 Drawing Sheets

FILLED POLYIMIDE FILMS AND COVERLAYS COMPRISING SUCH FILMS

FIELD OF THE INVENTION

The present invention relates generally to filled polyimides that can be used in films and articles comprising the films. The films are useful in coverlay applications and have advantageous optical properties.

BACKGROUND

A coverlay is used as a protective cover film for flexible printed circuit boards, electronic components and the leadframe of an integrated circuit package. The coverlay can prevent damage from scratches, oxidation and contamination.

Coverlays desirably have certain electrical properties (e.g., dielectric strength), as well as acceptable structural and optical properties to provide visual appeal and security against unwanted visual inspection and tampering of the electronic components protected by the coverlay.

Typically, a coverlay comprises a single layer or multilayered polyimide film approximately 0.5 mil (12.5 microns) thick, with an adhesive coated on one side. For some applications, it is especially desirable to have a black, opaque coverlay.

Black, opaque polyimide films can be made by incorporating additives such as dyes, pigments, and/or carbon black into polyimide precursor solutions prior to imidization of the polyimide. Although this can provide films with the desired optical properties, other critical properties (e.g., film strength, dielectric properties) can be adversely affected by the additives.

There remains a need for an improved black polyimide film with good mechanical strength and dielectric properties for use in coverlay applications.

SUMMARY

One aspect of the present invention is a filled polyimide film comprising:
 a continuous polyimide phase, wherein the polyimide is derived from a polyimide precursor derived from:
  i) at least 50 mole percent of an aromatic dianhydride, based upon a total dianhydride content of the polyimide and
  ii) at least 50 mole percent of an aromatic diamine based upon a total diamine content of the polyimide;
 a dispersed carbon phase comprising substantially amorphous carbon domains, wherein the average carbon domain size is equal to or less than 2 microns; and
 dispersed closed voids having an average longest dimension of about 0.1 microns to about 10 microns and containing substantially amorphous carbon.
  Another aspect of the present invention is a filled polyimide film obtained by a method comprising;
  a) contacting with sufficient mixing:
  i) a solution comprising polyacrylonitrile;
  ii) a solution comprising a cellulosic polymer having an average molecular weight in the range of about 500 to about 300,000 dalton; and
  iii) a solution comprising a polyimide precursor
 to form a polyacrylonitrile/cellulosic polymer/polyimide precursor blend in which the polyimide precursor forms a continuous phase, the polyacrylonitrile forms a discontinuous phase consisting of polyacrylonitrile domains, and the cellulosic polymer forms a discontinuous phase consisting of cellulosic polymer domains; wherein:
  the polyimide precursor is derived from at least 50 mole percent of an aromatic dianhydride, based upon a total dianhydride content of the polyimide precursor, and at least 50 mole percent of an aromatic diamine based upon a total diamine content of the polyimide precursor;
  the polyacrylonitrile domains have an average size of 2 microns or less;
  the polyacrylonitrile has a loading of from about 1 weight percent to about 50 weight percent, based on the weight of the polyimide obtainable from the polyimide precursor; and
  the loading of cellulosic polymer is from about 1 weight percent to about 40 weight percent, based on the weight of the polyimide obtainable from the polyimide precursor;
 b) forming a film from the polyacrylonitrile/cellulosic polymer/polyimide precursor blend; and
 c) heating the polyacrylonitrile/cellulosic polymer/polyimide precursor blend film to a temperature of about 300° C. to about 500° C. to convert the polyacrylonitrile domains to substantially amorphous carbon domains, the cellulosic polymer domains to dispersed closed voids having an average longest dimension of about 0.1 microns to about 10 microns and containing substantially amorphous carbon, and the polyimide precursor to polyimide.

DETAILED DESCRIPTION

Figure 1:
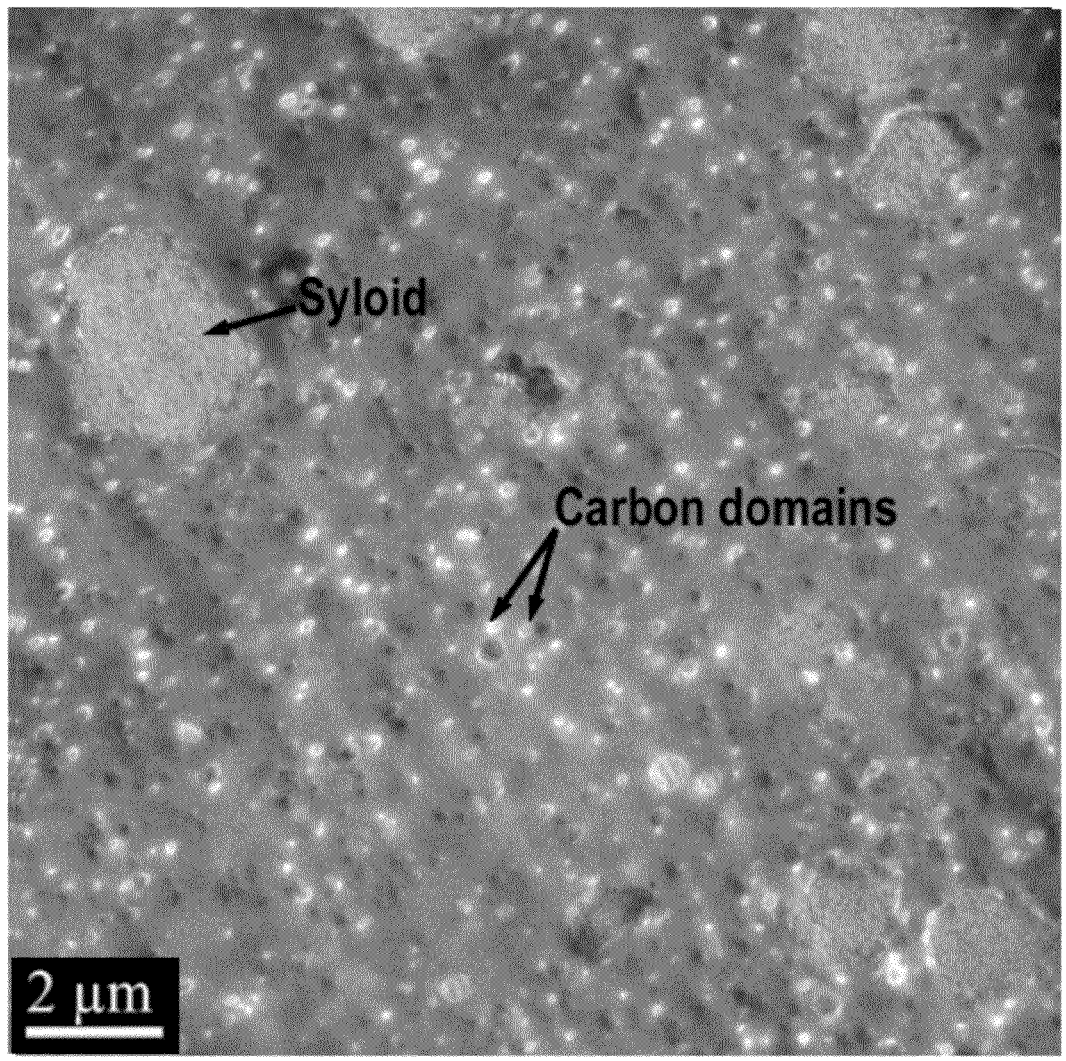
FIG. 1 shows a transmission electron microscopy (TEM) cross-section of a cured polyimide film prepared as disclosed in Comparative Example A.

The following discussion is directed to the preferred embodiments of the present invention only, and nothing within the following disclosure is intended to limit the overall scope of this invention. The scope of the present invention is to be defined solely by the claims, as presented at the end of this specification.

Definitions

The methods disclosed herein are disclosed with reference to the following terms.

As used herein, where the indefinite article "a" or "an" is used with respect to a statement or description of the presence of a step in a process disclosed herein, unless the statement or description explicitly provides to the contrary, the use of such indefinite article is not intended to limit the presence of the step in the process to one in number.

As used herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "about" modifying the quantity of an ingredient or reactant employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, preferably within 5% of the reported numerical value.

"Dianhydride" as used herein is intended to include dianhydrides, precursors or derivatives thereof, which may not technically be a dianhydride but would nevertheless react with a diamine to form a polyamic acid which could in turn be converted into a polyimide.

"Diamine" as used herein is intended to include diamines, precursors or derivatives thereof, which may not technically be a diamine but would nevertheless react with a dianhydride to form a polyamic acid which could in turn be converted into a polyimide.

"Precursor" and "polyamic acid" may be used interchangeably and as used herein each is intended to mean a relatively low molecular weight polyamic acid solution which is prepared by using a stoichiometric excess of diamine in order to give a solution viscosity of approximately 40-100 Poise.

"Continuous phase" as used herein refers to the major component of a polymer blend, a filled polyimide polymer, or a filled polyimide film which extends without interruption. "Discontinuous phase" as used herein refers to a component of a polymer blend, a filled polyimide polymer, or a filled polyimide film which is dispersed within the continuous phase.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

"Void" as used herein refers to an interstice in a polyimide phase which is free of polyacrylonitrile, free of cellulosic polymer, and free of polyimide, and which may contain substantially amorphous carbon. "Closed void" as used herein refers to a void which is isolated from other voids by intervening polyimide and thus is not part of an interconnected network of polymer-free space.

"Substantially amorphous carbon" as used herein refers to carbon of which at least 90% on a weight basis does not have any clear shape, form, or crystalline structure.

As used herein, the phrase "polyimide obtainable from the polyimide precursor" refers to the theoretical amount of polyimide polymer which can be formed from the polyimide precursor, accounting for the stoichiometry of the monomers employed and discounting the water formed during imidization.

Polyamic Acid Solution

A polyamic acid solution is formed from a diamine component and a dianhydride component forming a polyimide precursor in a suitable solvent. Therefore, the polyamic acid solution comprises a polyimide precursor and a solvent. In some embodiments, the polyimide precursor is derived from at least 50 mole percent of an aromatic dianhydride, based upon a total dianhydride content of the polyimide precursor, and at least 50 mole percent of an aromatic diamine based upon a total diamine content of the polyimide precursor. In some embodiments, the aromatic dianhydride is selected from the group consisting of:

pyromellitic dianhydride (PMDA),
3,3',4,4'-biphenyl tetracarboxylic dianhydride (BPDA),
3,3',4,4'-benzophenone tetracarboxylic dianhydride (BTDA),
4,4'-oxydiphthalic anhydride,
3,3',4,4'-diphenyl sulfone tetracarboxylic dianhydride,
2,2-bis(3,4-dicarboxyphenyl) hexafluoropropane dianhydride,
Bisphenol A dianhydride, and
mixtures thereof.

In some embodiments, the aromatic diamine is selected from the group consisting of:

3,4'-oxydianiline(3,4'-ODA),
1,3-bis-(4-aminophenoxy)benzene (RODA),
4,4'-oxydianiline (4,4'-ODA),
1,4-diaminobenzene(PPD),
1,3-diaminobenzene (MPD),
2,2'-bis(trifluoromethyl)benzidene,
4,4'-diaminobiphenyl,
4,4'-diaminodiphenyl sulfide,
9,9'-bis(4-amino)fluorine and
mixtures thereof.

In another embodiment, the diamine is 1,4-diaminobenzene and the dianhydride is 3,3',4,4'-biphenyl tetracarboxylic dianhydride. In another embodiment, the diamine is 4,4'-oxydianiline and the dianhydride is pyromellitic dianhydride. In yet another embodiment, the diamine is a mixture of 1,4-diaminobenzene and 1,3-diaminobenzene, and the dianhydride is 3,3',4,4'-biphenyl tetracarboxylic dianhydride.

In some embodiments, the polyimide precursor is derived from: 10 to 90 mole % of biphenyl tetracarboxylic dianhydride; 90 to 10 mole % of pyromellitic dianhydride; 10 to 90 mole % of 1,4-diaminobenzene; and 90 to 10 mole % of 4,4'-oxydianiline.

In some embodiments, the diamine component is selected from 1,4-diaminobenzene and 4,4'-oxydianiline. The dianhydride component is selected from pyromellitic dianhydride and 3,3',4,4'-biphenyl tetracarboxylic dianhydride.

In another embodiment, the diamine is a mixture of 1,4-diaminobenzene (PPD) and 4,4'-oxydianiline (ODA) and the dianhydride is a mixture of pyromellitic dianhydride PMDA and 3,3',4,4'-biphenyl tetracarboxylic dianhydride (BPDA). In one embodiment, the polyimide is derived from: 10 to 90 mole %, or 30 to 50 mole %, of biphenyl tetracarboxylic dianhydride; 90 to 10 mole %, or 70 to 50 mol %, of pyromellitic dianhydride; 10 to 90 mole %, or 60 to 80 mole %, of 1,4-diaminobenzene; and 90 to 10 mole %, or 40 to 20 mole %, of 4,4'-oxydianiline.

Solvent

Suitable solvents for forming the polyamic acid solution are those capable of dissolving one or both of the polymerizing reactants and the polyamic acid polymerization product. The solvent should be substantially unreactive with all of the polymerizing reactants and with the polyamic acid polymerization product. Suitable solvents include sulfoxide solvents (e.g., dimethyl sulfoxide and diethyl sulfoxide), formamide solvents (e.g., N,N-dimethylformamide and N,N-diethylformamide), acetamide solvents (e.g., N,N-dimethylacetamide and N,N-diethylacetamide), pyrrolidone solvents (e.g., N-methyl-2-pyrrolidone and N-vinyl-2-pyrrolidone), phenol solvents (e.g., phenol, o-, m- or p-cresol, xylenol, halogenated phenols, and catechol), hexamethylphosphoramide, tetramethyl urea, dimethylsulfone and gamma-butyrolactone. These solvents can also be used in combination with aromatic hydrocarbons such as xylene and toluene, or ether containing solvents such as diglyme, propylene glycol methyl ether, propylene glycol, methyl ether acetate, and tetrahydrofuran.

Polyamic Acid Solution—Formation

The polyamic acid solutions are generally made by dissolving the diamine in a dry solvent and slowly adding the dianhydride under conditions of agitation and controlled temperature in an inert atmosphere. In one embodiment the diamine is present as a 5 to 15 weight percent solution in the solvent and the diamine and dianhydride are usually used in about equimolar amounts.

Numerous embodiments of formation are possible, such as: (a) a method wherein the diamine components and dianhydride components are preliminarily mixed together and then the mixture is added in portions to a solvent while stirring, (b) a method wherein a solvent is added to a stirring mixture of diamine and dianhydride components, (c) a method wherein diamines are exclusively dissolved in a solvent and then dianhydrides are added thereto, (d) a method wherein the dianhydride components are exclusively dissolved in a solvent and then amine components are added thereto, (e) a method wherein the diamine components and the dianhydride components are separately dissolved in solvents and then these solutions are mixed in a reactor, (f) a method wherein the polyamic acid with excessive amine component and another polyamic acid with excessive dianhydride component are preliminarily formed and then reacted with each other in a reactor, particularly in such a way as to create a non-random or block copolymer, and (g) a method wherein a specific portion of the amine components and the dianhydride components are first reacted and then the residual diamine components are reacted, or vice versa, (h) a method wherein the components are added in part or in whole in any order to either part or whole of the solvent, also where part or all of any component can be added as a solution in part or all of the solvent, and (i) a method of first reacting one of the dianhydride components with one of the diamine components giving a first polyamic acid, then reacting the other dianhydride component with the other amine component to give a second polyamic acid, and then combining the polyamic acids in any one of a number of ways prior to film or fiber formation.

The dianhydride and diamine components are typically combined in a molar ratio of aromatic dianhydride component to aromatic diamine component of from 0.90 to 1.10. Molecular weight can be adjusted by adjusting the molar ratio of the dianhydride and diamine components.

In one embodiment, the polyamic acid solution is dissolved in an organic solvent at a concentration from about 5, 10 or 12% to about 12, 15, 20, 25, 27, 30% by weight.

If the filled polyimide is to be used as a film, the polyamic acid solution may be combined with conversion chemicals, including: (i) one or more dehydrating agents, such as, aliphatic acid anhydrides (e.g., acetic anhydride) and aromatic acid anhydrides; and (ii) one or more catalysts, such as aliphatic tertiary amines (e.g., triethylamine), aromatic tertiary amines (e.g., dimethylaniline) and heterocyclic tertiary amines (e.g., pyridine, picoline, and isoquinoline). The anhydride dehydrating material is often used in a molar excess of the amount of amide acid groups in the copolyamic acid. The amount of acetic anhydride used is typically about 2.0-3.0 moles per equivalent of copolyamic acid. Generally, a comparable amount of tertiary amine catalyst is used.

Polyacrylonitrile

For use, the polyacrylonitrile (PAN) polymer is dissolved in a solvent, for example dimethylformamide (DMF), N,N-dimethylacetamide (DMAC) or N-methylpyrrolidone (NMP). A solution of PAN can be formed by heating PAN in the selected solvent. Solutions of 5-25 wt % PAN are useful for forming dispersions of PAN in the polyimide precursor, for example solutions of about 5 wt % to about 10 wt %, or about 5 wt % to about 15 wt %, or about 5 wt % to about 20 wt % PAN. In one embodiment, the PAN may have an average molecular weight in the range of about 10,000 to about 300,000 dalton. In one embodiment, the PAN may have an average molecular weight of about 150,000 dalton.

In some embodiments, polyacrylonitrile is a homopolymer. In another embodiment, polyacrylonitrile is a copolymer with up to 10 mole percent methyl acrylate, vinyl acetate, methacrylic acid, itaconic acid or mixtures thereof. Polyacrylonitrile is commercially available, e.g., from Sigma-Aldrich Chemical Company (St. Louis, Mo.).

As the polyimide precursor is converted to polyimide in the curing step, the polyacrylonitrile polymer is pyrolyzed to amorphous carbon.

Cellulosic Polymer

Cellulosic polymer useful in the processes disclosed herein can comprise microcrystalline cellulose, a cellulose ester, a cellulose ether, or a combination of two or more thereof. In one embodiment, the cellulosic polymer may comprise microcrystalline cellulose. In one embodiment, the cellulosic polymer may comprise a cellulose ester such as, for example, cellulose acetate, cellulose triacetate, cellulose acetate propionate, or cellulose acetate butyrate. In one embodiment, the cellulose ester may comprise cellulose acetate, cellulose acetate butyrate, or a combination of two or more thereof. In one embodiment, the cellulosic polymer may comprise a cellulose ether such as, for example, hydroxypropyl cellulose, methyl ethyl cellulose, or carboxymethyl cellulose. In one embodiment, the cellulosic polymer may have an average molecular weight in the range of about 500 to about 300,000 dalton. In another embodiment, the cellulosic polymer may have an average molecular weight in the range of about 5000 to about 100,000 dalton. In another embodiment, the cellulosic polymer may have an average molecular weight in the range of about 10,000 to about 70,000 dalton. In one embodiment, a mixture of at least two cellulosic polymers, each having a different average molecular weight, is used. Typically, cellulosic polymers disperse well in the polyimide precursor matrix. Cellulosic polymers are typically commercially available in either powder or pelletized form, and either form can be used.

For use, the cellulosic polymer is dissolved in a solvent, for example dimethylformamide (DMF), N,N-dimethylacetamide (DMAC) or N-methylpyrrolidone (NMP). Mixtures of such solvents may also be used. A solution of cellulosic polymer can be formed by heating the cellulosic polymer with stirring in the selected solvent. The rate of dissolution of the cellulosic polymer can be increased by using higher temperatures. Solutions of about 1 wt % to about 40 wt % cellulosic polymer are useful for forming dispersions of cellulosic polymer in the polyimide precursor, for example solutions of about 1 wt % to about 5 wt %, or about 1 wt % to about 10 wt %, or about 1 wt % to about 20 wt %, or about 1 wt % to about 30 wt %, or about 10 wt % to about 40 wt %, or about 20 wt % to about 40 wt % cellulosic polymer. The solvent contained in the solution comprising the cellulosic polymer may be the same or different from the solvent contained in the solution comprising the polyimide precursor.

As the polyimide precursor is converted to polyimide in the curing step, the cellulosic polymer is pyrolyzed and closed voids containing amorphous carbon are formed.

Blend Formation

One embodiment is a composition comprising a polymer blend comprising a polyimide precursor, a polyacrylonitrile, and a cellulosic polymer in which the polyimide precursor forms a continuous phase, the polyacrylonitrile forms a discontinuous phase consisting of polyacrylonitrile domains, and the cellulosic polymer forms a discontinuous phase consisting of cellulosic polymer domains. The domains of polyacrylonitrile are dispersed in the continuous phase of the polyimide precursor. The domains of cellulosic polymer are dispersed in the continuous phase of the polyimide precursor. In one embodiment, at least some of the polyacrylonitrile domains and at least some of the cellulosic polymer domains contact one another to form domains comprising both polyacrylonitrile and cellulosic polymer. In these domains, the polyacrylonitrile and cellulosic polymer do not undergo phase separation from one another. The polyimide precursor phase may contain solvents in addition to the precursor. The cellulosic polymer phase and/or the PAN phase may contain solvents in addition to the polymer. The polymer blend is referred to herein as a polyacrylonitrile/cellulosic polymer/polyimide precursor blend.

The blend is formed by contacting, with sufficient mixing, i) a solution comprising PAN, ii) a solution comprising a cellulosic polymer, and iii) a solution comprising a polyimide precursor. By sufficient mixing is meant that the PAN solution, the cellulosic polymer solution, and the polyimide precursor solution are well dispersed in the blend and that their dispersion is not mass transfer limited. The contacting is typically performed by mixing. In one embodiment, paddle blades are used, for example, with a high torque mixer. The blend comprises from about 1 to about 50 weight percent PAN, based on the weight of the polyimide obtainable from the polyimide polymer. In one embodiment, the blend comprises from about 2 to about 15 weight percent PAN. The blend comprises about 1 to about 40 weight percent cellulosic polymer, based on the weight of polyimide obtainable from the polyimide precursor.

The composition comprising a polymer blend comprising a polyacrylonitrile, a cellulosic polymer, and a polyimide precursor can be used to form a film, which may optionally be dried to remove solvent, for example in air between about 80° C. and 200° C. Such a film is referred to as uncured because the polyimide precursor has not been converted to polyimide. Typically, the average domain size of the PAN phase in an uncured, dried film comprising the composition is 2 microns or less, for example 0.1-2 microns, preferably 0.25-0.75 microns, as determined by SEM. Typically, the domains of the cellulosic polymer phase in the blend have an average longest dimension of about 0.1 microns to about 20 microns for example from 0.1 microns to 8 microns, or from 0.1 microns to 6 microns, or from 0.1 microns to 4 microns, as determined by SEM. The cellulosic polymer phase domains can be spherical or elongated in shape, or of other shapes.

In some embodiments, the dispersed phase comprises both PAN and cellulosic polymer. Typically, the domains which comprise both PAN and cellulosic polymer have an average longest dimension of about 0.1 microns to about 20 microns for example from 0.1 microns to 8 microns, or from 0.1 microns to 6 microns, or from 0.1 microns to 4 microns, as determined by SEM. Such domains can be spherical or elongated in shape, or of other shapes.

When the film is cured, the polyimide precursor is converted to a continuous polyimide phase, the PAN domains are converted to substantially amorphous carbon, and the cellulosic polymer domains are converted to dispersed closed voids containing substantially amorphous carbon. The cured film is referred to herein as a filled polyimide film.

Formation of a Polymer Blend Film, a Filled Polyimide Polymer, and a Filled Polyimide Film The composition comprising the polymer blend can be cast or applied onto a support, such as a glass, metal or polymer substrate or an endless belt or rotating drum, to give a film. Next, the solvent-containing film can be converted into a self-supporting film by heating in air or nitrogen at 80° C. to 200° C. In some embodiments, the film is then separated from the support, oriented such as by tentering, with continued heating (curing) in nitrogen at 300-500° C. to provide a filled polyimide film in which the polyimide precursor has been converted to a polyimide, the PAN has been substantially converted to amorphous carbon, and the cellulosic polymer has been converted to a substantial number of closed voids containing amorphous carbon. In some embodiments, a cure temperature of about 400° C. to about 450° C. is used. In other embodiments, the film remains on the support through the curing process. The cure time depends in part on the cure temperature and can range from several minutes to an hour or longer.

Typically, the average carbon domain size of the dispersed carbon phase derived from the PAN is equal to or less than 2 microns, for example equal to or less than 1 micron.

Typically, the closed voids in the polyimide phase have an average longest dimension of about 0.1 microns to about 10 microns, for example from 0.1 microns to 8 microns, or from 0.1 microns to 6 microns, or from 0.1 microns to 4 microns. The average longest dimension of the voids may be determined, for example, by SEM. The closed voids can be spherical or elongated in shape, or of other shapes.

The substantially amorphous carbon contained within the voids is typically in the form of a particle, a coating, or both. Other forms are also possible. In one embodiment, a particle may fill a void partially or nearly entirely. In one embodiment, a coating may be present on at least a portion of the surface of the polyimide phase in contact with a void (i.e. on the walls of the void), including on the entirety of the surface of the polyimide phase surrounding the void.

In one embodiment, a filled polyimide polymer is obtained by a method comprising the steps of:
a) contacting with sufficient mixing:
i) a solution comprising polyacrylonitrile;
ii) a solution comprising a cellulosic polymer having an average molecular weight in the range of about 500 to about 300,000 Dalton; and
iii) a solution comprising a polyimide precursor to form a polyacrylonitrile/cellulosic polymer/polyimide precursor blend in which the polyimide precursor forms a continuous phase, the polyacrylonitrile forms a discontinuous phase consisting of polyacrylonitrile domains, and the cellulosic polymer forms a discontinuous phase consisting of cellulosic polymer domains;
wherein:
the polyimide precursor is derived from at least 50 mole percent of an aromatic dianhydride, based upon a total dianhydride content of the polyimide precursor, and at least 50 mole percent of an aromatic diamine based upon a total diamine content of the polyimide precursor;
the polyacrylonitrile domains have an average size of 2 microns or less;
the polyacrylonitrile has a loading of from about 1 weight percent to about 50 weight percent, based on the weight of the polyimide obtainable from the polyimide precursor; and
the cellulosic polymer has a loading of from about 1 weight percent to about 40 weight percent, based on the weight of the polyimide obtainable from the polyimide precursor; and
b) heating the polyacrylonitrile/cellulosic polymer/polyimide precursor blend to a temperature of about 300° C. to about 500° C. to convert the polyacrylonitrile domains to substantially amorphous carbon domains, the cellulosic polymer domains to dispersed closed voids having an average longest dimension of about 0.1 microns to about 10 microns and containing substantially amorphous carbon, and the polyimide precursor to polyimide.

In one embodiment, a filled polyimide polymer comprises a continuous polyimide phase, wherein the polyimide is derived from a polyimide precursor derived from:
i) at least 50 mole percent of an aromatic dianhydride, based upon a total dianhydride content of the polyimide, and
ii) at least 50 mole percent of an aromatic diamine based upon a total diamine content of the polyimide;
a dispersed carbon phase comprising substantially amorphous carbon domains, wherein the average carbon domain size is equal to or less than 2 microns; and
dispersed closed voids having an average longest dimension of about 0.1 microns to about 10 microns and containing substantially amorphous carbon.

In one embodiment, a filled polyimide film is obtained by a method comprising the steps of:
a) contacting with sufficient mixing:
i) a solution comprising polyacrylonitrile;
ii) a solution comprising a cellulosic polymer having an average molecular weight in the range of about 500 to about 300,000 Dalton; and
iii) a solution comprising a polyimide precursor to form a polyacrylonitrile/cellulosic polymer/polyimide precursor blend in which the polyimide precursor forms a continuous phase, the polyacrylonitrile forms a discontinuous phase consisting of polyacrylonitrile domains, and the cellulosic polymer forms a discontinuous phase consisting of cellulosic polymer domains;
wherein:
the polyimide precursor is derived from at least 50 mole percent of an aromatic dianhydride, based upon a total dianhydride content of the polyimide precursor, and at least 50 mole percent of an aromatic diamine based upon a total diamine content of the polyimide precursor;
the polyacrylonitrile domains have an average size of 2 microns or less and the polyacrylonitrile has a loading of from about 1 weight percent to about 50 weight percent, based on the weight of the polyimide obtainable from the polyimide precursor; and
the loading of cellulosic polymer is from about 1 weight percent to about 40 weight percent, based on the weight of the polyimide obtainable from the polyimide precursor;
b) forming a film from the polyacrylonitrile/cellulosic polymer/polyimide precursor blend; and
c) heating the polyacrylonitrile/cellulosic polymer/polyimide precursor blend film to a temperature of about 300° C. to about 500° C. to convert the polyacrylonitrile domains to substantially amorphous carbon domains, the cellulosic polymer domains to dispersed closed voids having an average longest dimension of about 0.1 microns to about 10 microns and containing substantially amorphous carbon, and the polyimide precursor to polyimide.

In one embodiment, a filled polyimide film comprises a continuous polyimide phase, wherein the polyimide is derived from a polyimide precursor derived from:
i) at least 50 mole percent of an aromatic dianhydride, based upon a total dianhydride content of the polyimide, and
ii) at least 50 mole percent of an aromatic diamine based upon a total diamine content of the polyimide;
a dispersed carbon phase comprising substantially amorphous carbon domains, wherein the average carbon domain size is equal to or less than 2 microns; and
dispersed closed voids having an average longest dimension of about 0.1 microns to about 10 microns and containing substantially amorphous carbon.

After curing, the filled polyimide film is highly colored, with the colors ranging from brown to black. More intense colors are achieved using higher ratios of PAN and/or cellulosic polymer to polyimide precursor and/or by more intense heating during the curing step (i.e., higher temperatures and/or longer times). Thus the color intensity can be fine tuned by adjusting the weight percent loading of PAN, the weight percent loading of cellulosic polymer, the cure temperature, and/or the cure time.

Typically, the cured film has a matte finish as compared to the finish of a cured polyimide film prepared similarly but without the addition of a cellulosic polymer. In one embodiment, the gloss of the cured polyimide film is less than 90 as measured at 60 degrees. In one embodiment, the gloss of the cured polyimide film is less than 40. If desired, the matte finish can be enhanced by adding matte agents at any stage of the process prior to casting or by treating the surface of the cured film. Typical matte agents include amorphous silica, such as precipitated silica, fumed silica, diatomaceous silica, and silica gels. Other matte agents include inorganic particles, metal stearates, and nanoparticles.

In some embodiments, the desired optical density is greater than or equal to 1. In some embodiments, the optical density of the polyimide film is greater than 1 for a 1 mil (about 25 microns) film and the gloss is less than 90 as measured at 60 degrees. In some embodiments, the optical density of the polyimide film is greater than 2 for a 1 mil film and the gloss is less than 40 as measured at 60 degrees.

Because the blend contains solvent that is removed during the drying and converting steps, the cast film generally is restrained during drying to avoid undesired shrinkage. In continuous production, the film can be held at the edges, such as in a tenter frame, using tenter clips or pins for restraint. Alternatively, the film can be stretched by as much as 200 percent from its initial dimension. In film manufacture, stretching can be in either the longitudinal direction or the transverse direction or both. If desired, restraint can also be provided to permit some limited degree of shrinkage.

High temperatures can be used for short times to dry the film and induce imidization to convert the polyimide precursor to a polyimide in the same step. Generally, less heat and time are required for thin films than for thicker films.

The thickness of the film may be adjusted depending on the intended purpose of the film or final application specifications. It is generally preferred that the thickness of the film ranges from 2, 3, 5, 7, 8, 10, 12, 15, 20, or 25 microns to about 25, 30, 35, 40, 45, 50, 60, 80, 100, 125, 150, 175, 200, 300, 400 or 500 microns. Preferably, the thickness is from about 8 to about 125 microns.

A uniform dispersion of closed voids containing substantially amorphous carbon not only does not increase the electrical conductivity, but additionally tends to produce uniform color intensity of the polyimide. In contrast, adding fillers like carbon to polyimide would typically result in the formation of conducting networks because of the percolation of the filler in the polyimide, with a resulting increase in the electrical conductivity. In some embodiments, the mean particle size of the PAN-derived carbon is between (and optionally including) any two of the following sizes: 0.2, 0.3, 0.4, 0.5, 0.6, 0.7, 0.8, 0.9, 1.0, 1.5 and 2.0 microns. In some embodiments, the mean particle size of the cellulosic polymer-derived carbon contained in the voids is between (and optionally including) any two of the following sizes: 0.1, 0.2, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, and 10.0 microns. The thickness of the film can be tailored to the specific application.

Formation of a Filled Polyimide Fiber from the Polymer Blend Composition

Filled polyimide fibers can also be made from the composition comprising a polymer blend comprising a polyacrylonitrile, a cellulosic polymer, and a polyimide precursor. Fiber can be spun from the composition and then heated to convert the polyimide precursor into a continuous polyimide phase, the polyacrylonitrile into a discontinuous carbon phase, and the cellulosic polymer into closed voids containing substantially amorphous carbon. The high temperature imidization/carbonization step can be carried out on the fiber immediately after spinning. Alternatively, the yarn, fabric or article made from the fiber can be heated to the appropriate temperature.

Filled polyimide polymer of shapes other than films or fibers can also be made from the composition comprising a polymer blend comprising a polyimide precursor, a polyacrylonitrile, and a cellulosic polymer using methods known in the art.

Coverlay

The filled polyimide film disclosed herein can be used as a coverlay film for flexible printed circuit boards, electronic components or the leadframe of an integrated circuit package.

Adhesives

In one embodiment, the coverlay film comprises a filled polyimide film and an adhesive layer for maintaining the placement of the coverlay film once applied. The adhesive may be coated on at least one side of the filled polyimide film. Examples of adhesives useful in forming the adhesive layer include thermoplastic polyimide resins, epoxy resins, phenolic resins, melamine resins, acrylic resins, cyanate resins, and combinations of two or more thereof. In some embodiments, the adhesive is a polyimide resin that can flow and bond at temperatures below the polyimide decomposition temperature. In one embodiment, the adhesive is a polyimide thermoplastic resin, optionally further comprising a thermosetting adhesive, such as, epoxy resin and/or phenolic resin. For adhesives having both thermoplastic and thermosetting components, the content of the thermosetting resin in the adhesive layer generally ranges from 5 to 400 parts by weight, preferably from 50 to 200 parts by weight, per 100 parts by weight of resin components other than the thermosetting resin.

In one embodiment, the adhesive consists of an epoxy resin and hardener, and, optionally, further contains additional components, such as an elastomer reinforcing agent, curing accelerator, filler, and flame retardant.

In some embodiments, the adhesive is an epoxy resin selected from the group consisting of: bisphenol A epoxy resins; bisphenol F epoxy resins; bisphenol S epoxy resins; phenol novolac epoxy resins; cresol novolac epoxy resins; biphenyl epoxy resins; biphenyl aralkyl epoxy resins; aralkyl epoxy resins; dicyclopentadiene epoxy resins; multifunctional epoxy resins; naphthalene epoxy resins; phosphorus containing epoxy resins; rubber modified epoxy resins, and mixtures of two or more thereof.

In some embodiments, the epoxy adhesive contains a hardener. Suitable hardeners include phenolic compounds selected from the group consisting of: novolac phenol resins; aralkyl phenol resins; biphenyl aralkyl phenol resins; multifunctional phenol resins; nitrogen-containing phenol resins; dicyclopentadiene phenol resins; and phosphorus-containing phenol resins.

In another embodiment, the hardener is an aromatic diamine compound selected from the group consisting of: diaminobiphenyl compounds, e.g., 4,4'-diaminobiphenyl and 4,4'-diamino-2,2'-dimethylbiphenyl; diaminodiphenylalkane compounds, e.g., 4,4'-diaminodiphenylmethane and 4,4'-diaminodiphenylethane; diaminodiphenyl ether compounds, e.g., 4,4'-diaminodiphenylether and di(4-amino-3-ethylphenyl)ether; diaminodiphenyl thioether compounds, e.g., 4,4'-diaminodiphenyl thioether and di(4-amino-3-propylphenyl)thioether; diaminodiphenyl sulfone compounds, e.g., 4,4'-diaminodiphenyl sulfone and di(4-amino-3-isopropylphenyl)sulfone; and phenylenediamines. In one embodiment, the hardener is an amine compound selected from the group consisting of: guanidines, e.g., dicyandiamide (DICY); and aliphatic diamines, e.g., ethylenediamine and diethylenediamine.

EXAMPLES

The methods disclosed herein are illustrated in the following examples. From the above discussion and these examples, one skilled in the art can ascertain the various embodiments of this invention, and without departing from the spirit and scope thereof, can make various changes and modifications of the methods and compositions disclosed herein to adapt it to various uses and conditions.

The following materials were used in the examples. All commercial reagents were used as received unless otherwise noted.

Polyamic acid (PAA) was supplied by DuPont Chip Packaging Materials, Circleville Ohio. Syloid® C803 was obtained from W.R. Grace (Columbia, Md.). Polyacrylonitrile (PAN) having an average molecular weight of 150,000 dalton was obtained from Sigma Aldrich (St. Louis, Mo.). Cellulose acetate (CAc) having 39.7 wt % acetyl content and an average molecular weight of 50,000 dalton was purchased from Sigma Aldrich. Pyromellitic dianhydride (PMDA) was purchased from Sigma Aldrich and dimethylacetamide (DMAc) was purchased from EMD (Gibbstown, N.J.). The high torque mixer (model RW20.n) was from IKA (Wilmington, N.C.) and the viscometer (model DV-I Prime) was from Brookfield (Middleboro, Mass.).

Shear viscosity was measured at room temperature using spindle number 5 and the speed of the spindle was adjusted so the torque was at least 50%. The viscometer drives the spindle immersed in the fluid through a calibrated spring and the viscous drag of the fluid against the spindle is measured by the spring deflection, which is measured with a rotary transducer.

Tear strength-Initial was measured according to ASTM D-1004-90 on 3 to 4 different parts of a cured film sample along the machine direction (MD). Typically 3-4 samples were tested per film made and the results averaged for reporting.

Optical density (OD) was measured at 3-4 different locations on the film with a 301 Densitometer (X-Rite Inc, Grand Rapids Mich.) and the OD values were normalized to 1 mil thickness. An optical density of 2 is intended to mean $1 \times 10^{-2}$ or 1% of light was transmitted through the film.

Gloss was measured at 60 degree angle with a Micro-Tri-Gloss meter (model GB-4825) from Tricor Systems (Elgin, Ill.). Gloss measurements are based on the principle that light reflection from a glossy surface is relatively higher than from a matte surface due increased light scattering on the matte surface. Therefore, light reflected from rough surfaces tends to be diffusely scattered in all direction and the image forming capabilities are diminished (blurry image).

Dielectric constant (Dk) and dissipation factor (Df) were measured with an Hewlett Packard (Santa Clara, Calif.) multi-frequency meters (4272A and 4275A model) at 1 KHz frequency on film samples coated with aluminum (Al) electrodes at least 100 nm thick on both sides. Al was sputtered on both sides of 4 inch×4 inch (about 10.1 cm×10.1 cm) cured film samples through a 1 inch (2.54 cm) diameter mask to provide electrical contact. The Al coated films were held between test tweezers (model 16034B) from Agilent (Santa Clara, Calif.). The multi-frequency meter was calibrated with and without an air gap prior to the measurement.

Film cross section samples were prepared for SEM imaging as follows. Two sections of film approximately 5 mm by 10 mm were cut from each submitted sample. The film was cut across the 5 mm width in the transverse direction, that is, perpendicular to the machine direction as marked on the sample as received, unless otherwise requested. One end of the 5 mm×10 mm sample was wrapped in masking tape.

The 5 mm×10 mm film was submerged in liquid nitrogen for at least 20 seconds. One of the following methods was then used to obtain a cross sectioned film.
1. Brittle samples fractured readily when touched to the bottom of the dewar containing the liquid nitrogen.
2. If a sample did not fracture when touched to the bottom of the dewar, a second attempt was made by folding the sample in a gentle loop before immersion in liquid nitrogen. After at least 20 seconds of immersion, the sample was pinched with a pair of needle-nosed pliers while still submerged in the liquid nitrogen.
3. If neither of the above two techniques was successful, a fresh single-edged blade was immersed in liquid nitrogen concurrently with the sample. After at least 20 seconds of immersion, the sample and the blade were withdrawn and the blade was chopped down on the sample on top of fresh glassine paper.

The cross sectioned film was mounted on a standard aluminum SEM stub using Duco cement. Once the cement had dried, the sample was coated with 2 nm Os metal coating using a OPC-80T osmium coater (SPI, Supplies). Cross sectioned film samples were imaged in a Hitachi S4000 FE (field emission) SEM at 5 keV accelerating voltage at 10 mm working distance.

Film cross section samples were prepared for TEM imaging as follows. Pieces of film were embedded in a liquid two-part epoxy mixture (Buehler EpoxiCure) and cured overnight at 60° C. in a 4 mm deep multicavity embedding mold. The hardened blocks were trimmed of excess epoxy to prepare a block face for sectioning.

To prepare ultrathin specimens, a diamond knife was used to cut sections by room temperature ultramicrotomy. The knife boat used to accumulate sections was filled with a mixture of 90/10 water/acetone. The prepared epoxy block was secured in the flat jaws of the cryoultramicrotome sample holder and sectioned to nominal thickness of 90 nm. The sections floating on the water/acetone mixture were retrieved on slim bar copper mesh grids and blotted on filter paper.

Unstained sections were examined in a JEOL Transmission Electron Microscope (TEM) operated at 200 KV accelerating voltage. Images of magnification 1000-95,000× were recorded on a digital camera. Sampling should include both the film surfaces in contact with embedding epoxy and interior portions of the film.

In the Figures, the polyimide phase is not labeled.

The following additional abbreviations are used: "C" is Celsius, "cm" is centimeter, "mm" is millimeter, "μm" is micrometer, "μL" is microliter, "mL" is milliliter, "min" is minute(s), "g" is gram(s), "wt" is weight, "wt %" means weight percent, "Temp" is temperature, "Comp. Ex." is Comparative Example, "gf" means gram force, "MW" means average molecular weight.

The weight of cellulose acetate needed to prepare a desired wt % loading of cellulose acetate in the polyacrylonitrile/cellulose acetate/polyimide precursor blend was determined by first calculating the weight of polyimide obtainable from the polyimide precursor solution, and then determining the weight of cellulose acetate to use based on the desired loading. The desired loading was calculated with respect to the weight of the polyimide obtainable from the polyimide precursor.

For example, the calculation of the amount of a 14 wt % solution of cellulose acetate needed to provide a loading of 5 wt % cellulose acetate in the blend composition was made as follows.

Given the weight of polyamic acid as 90 g (polymer+DMAc), and given the wt % of polyamic acid as 19.5%, the weight of the obtainable polyimide polymer was estimated to be 90 g×0.195=17.55 g.

Assuming that 5% of the polymer weight was water which evaporates after curing at 400° C., the weight of obtainable polyimide was calculated to be 17.55 g×0.95=16.67 g.

Thus the weight of CAc needed to prepare 5 wt % CAc was calculated as 16.67 g×0.05=0.83 g of CAc.

The weight of a 14% CAc solution needed for mixing with 90 g polyamic acid solution was then calculated as 0.83 g/0.14=5.92 g of CAc solution.

Comparative Example A

Polyimide Containing Carbon Domains Derived from PAN (with Matting Agent and without Cellulosic Polymer)

In this Comparative Example, 165 g of a 19.5 wt % solution of polyamic acid (PAA) in dimethylacetamide (DMAc) was mixed with 16.4 g of 14 wt % solution of polyacrylonitrile (PAN) dissolved in N-methylpyrrolidone (NMP) and 15.3 g of 10 wt % solution of SYLOID® matting agent C803 in DMAc for 15 min using a high torque mixer equipped with paddle blades. Then 6.60 g of a 6 wt % fresh solution of pyromellitic dianhydride (PMDA) in DMAc was added to the mixture of PAA, PAN and SYLOID® C803. The mixture was mixed for 30 min with the high torque mixer, during which time the viscosity increased to 1420 Poise at room temperature. A small amount (~10-30 g) of the mixture was then poured onto a Melinex® ST504 sheet (10×8 inches, 25.4 cm×20.3 cm) from DuPont Teijin Films and spread with a 10 mil (about 250 micron) film applicator from Gardco (Pompano Beach, Fla.). The cast film was dried in air on a hot plate for 60 min between 70° C. and 90° C., stored under vacuum at room temperature overnight, then cured under nitrogen at 400° C. for 10 min. The temperature of the oven was ramped at 4° C./min. The cured film was black in color. Table 1 presents the viscosity of the mixture before film casting, as well as the optical density, gloss, dielectric constant, dissipation factor, and initial tear resistance of the cured film.

A cross section of the cured film (FIG. 1) was analyzed by transmission electron microscopy (TEM), which revealed a uniform distribution of carbon domains derived from the PAN, as well as SYLOID® C803 particles, in the polyimide phase. The carbon domains were observed to be less than 2 microns in diameter.

Example 1

10 wt % Loading of Cellulose Acetate in PAN/Cellulosic Polymer/Polyimide Precursor Blend with Matting Agent In this Example, 65 g of the PAA, PAN and SYLOID® C803 mixture prepared in Comparative Example A was mixed with 5.3 g of a 10 wt % solution of cellulose acetate (CAc) dissolved in DMAc to prepare a PAN/cellulose acetate/polyimide precursor blend containing SYLOID® C803 matting agent. The methods and procedures of Comparative Example A were followed to prepare and cure a film from the blend. The cured film was black in color. Table 1 presents the viscosity of the blend before film casting, as well as the optical density, gloss, dielectric constant, dissipation factor, and initial tear resistance of the cured film.

Figure 2:
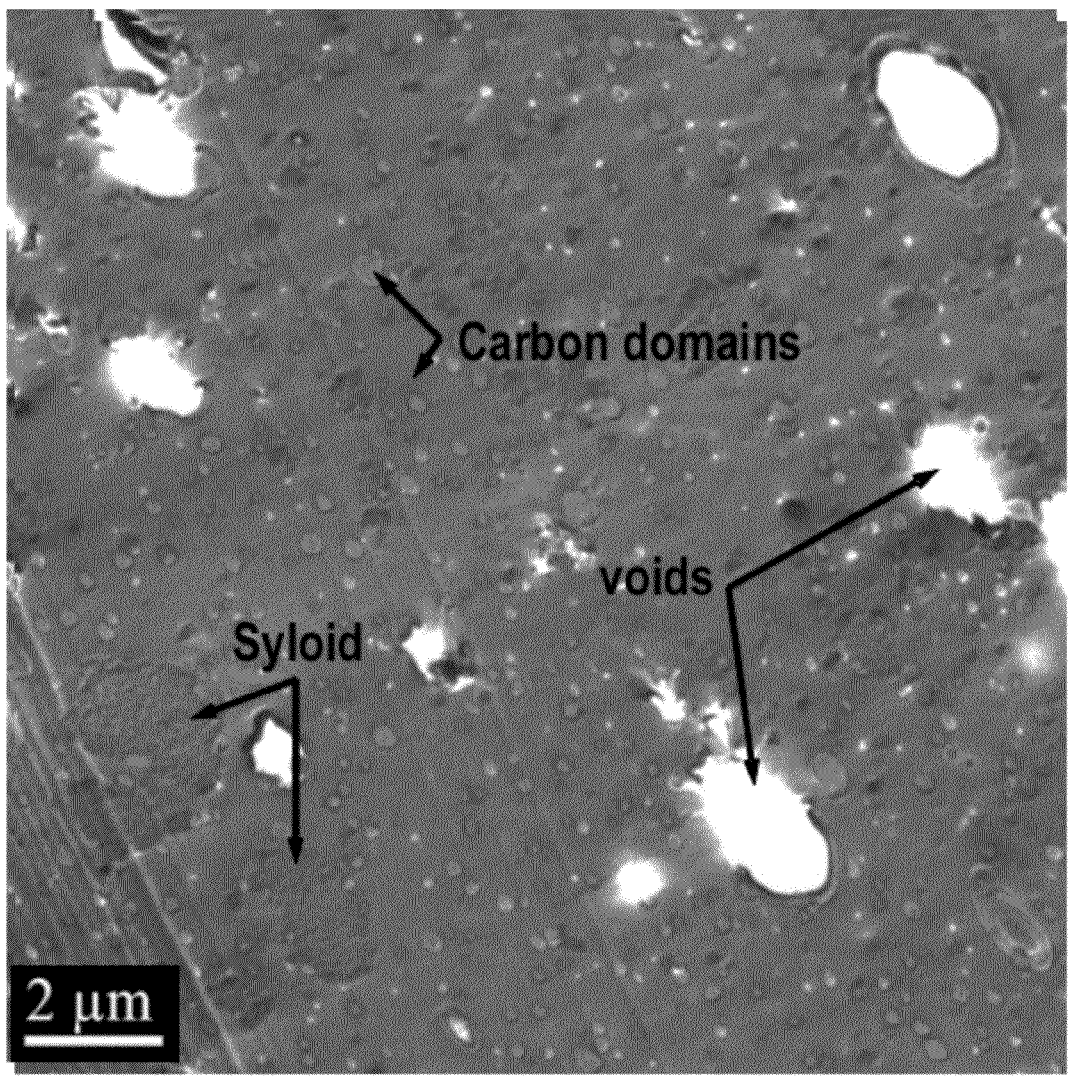
FIG. 2 shows a TEM cross-section of a cured polyimide film prepared as disclosed in Example 1.

A cross section of the cured film (FIG. 2) was analyzed by TEM, which revealed a uniform distribution of carbon domains derived from PAN, SYLOID® C803 particles, and a few closed and isolated voids containing carbon and derived from cellulose acetate.

Example 2

20 wt % Loading of Cellulose Acetate in PAN/Cellulosic Polymer/Polyimide Precursor Blend with Matting Agent In this Example, 65 g of the PAA, PAN and SYLOID® C803 mixture prepared in Comparative Example A was mixed with 10.5 g of a 20 wt % solution of cellulose acetate dissolved in DMAc to prepare a PAN/cellulose acetate/polyimide precursor blend containing SYLOID® C803 matting agent. The methods and procedures of Comparative Example A were followed to prepare and cure a film from the blend. The cured film was black in color. Table 1 presents the viscosity of the blend before film casting, as well as the optical density, gloss, dielectric constant, dissipation factor, and initial tear resistance of the cured film.

Figure 3:
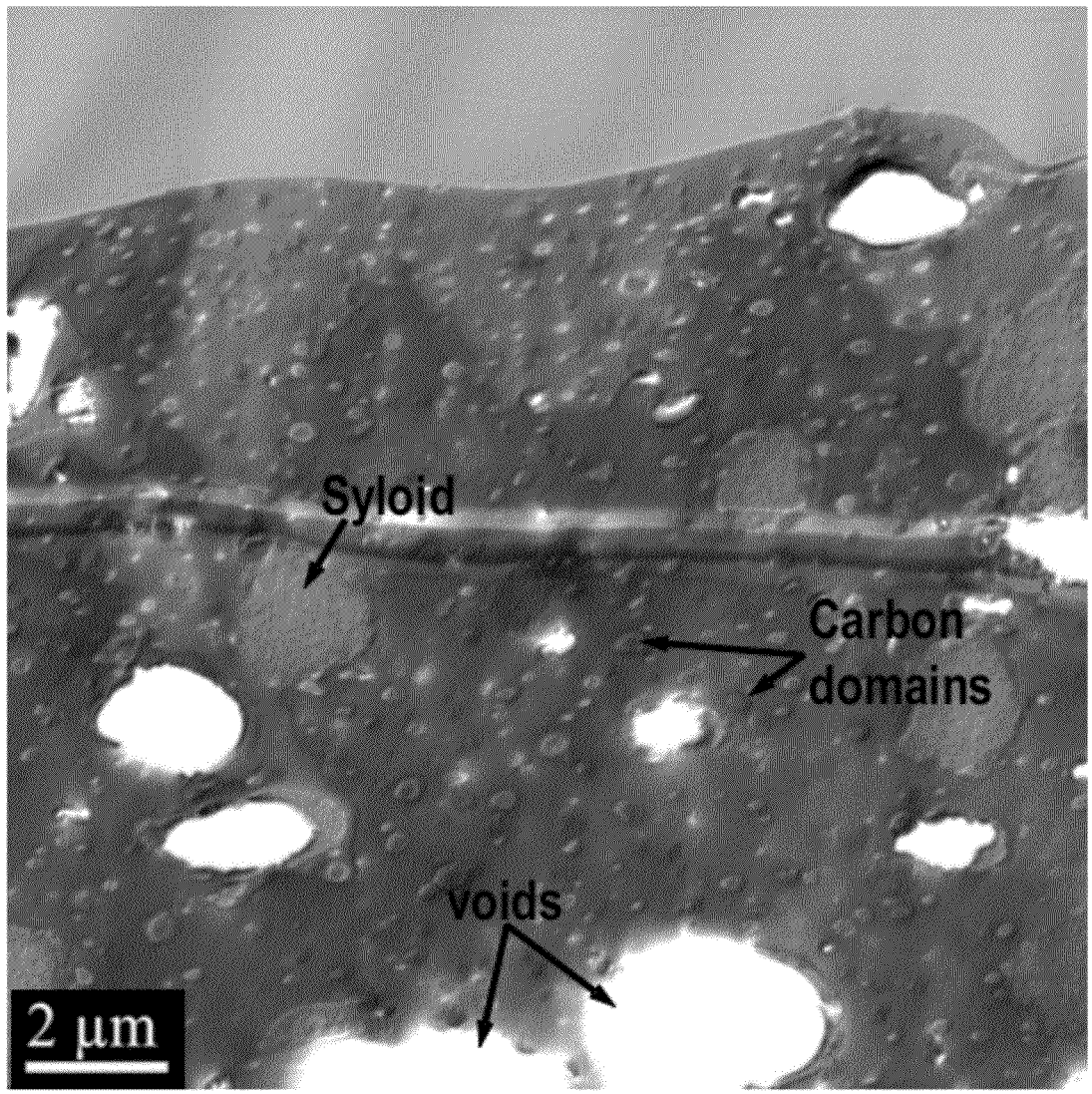
FIG. 3 shows a TEM cross-section of a cured polyimide film prepared as disclosed in Example 2.

A cross section of the cured film (FIG. 3) was analyzed by TEM, which revealed a uniform distribution of carbon domains derived from PAN, SYLOID® C803 particles, and closed and isolated voids containing carbon and derived from cellulose acetate.

The addition of cellulose acetate to the PAN, SYLOID® C803, and polyimide precursor mixture decreased the gloss of the cured film by about 50% compared to the gloss of the cured film prepared with the same amounts of PAN and SYLOID® C803 but without cellulose acetate (Comparative Example A). The initial tear strength of the cured film decreased by about 40% compared to that of the cured film prepared without cellulose acetate (Comparative Example A).

Comparative Example B

Polyimide Containing Carbon Domains Derived from PAN (without Matting Agent and without Cellulosic Polymer)

In this Comparative Example, 175 g of a 19.5 wt % solution of PAA in DMAc was mixed with 17.4 g of a 14 wt % solution of PAN dissolved in NMP for 15 min using a high torque mixer equipped with paddle blades. Then 6.67 g of a 6 wt % fresh solution of PMDA in DMAc was added to the mixture of PAA and PAN. The mixture was mixed for 30 min with the high torque mixer, during which time the viscosity increased to 2090 Poise at room temperature. The methods and procedures of Comparative Example A were followed to prepare and cure a film from the mixture. The cured film was black in color. Table 1 presents the viscosity of the mixture before film casting, as well as the optical density, gloss, dielectric constant, dissipation factor, and initial tear resistance of the cured film.

Figure 4:
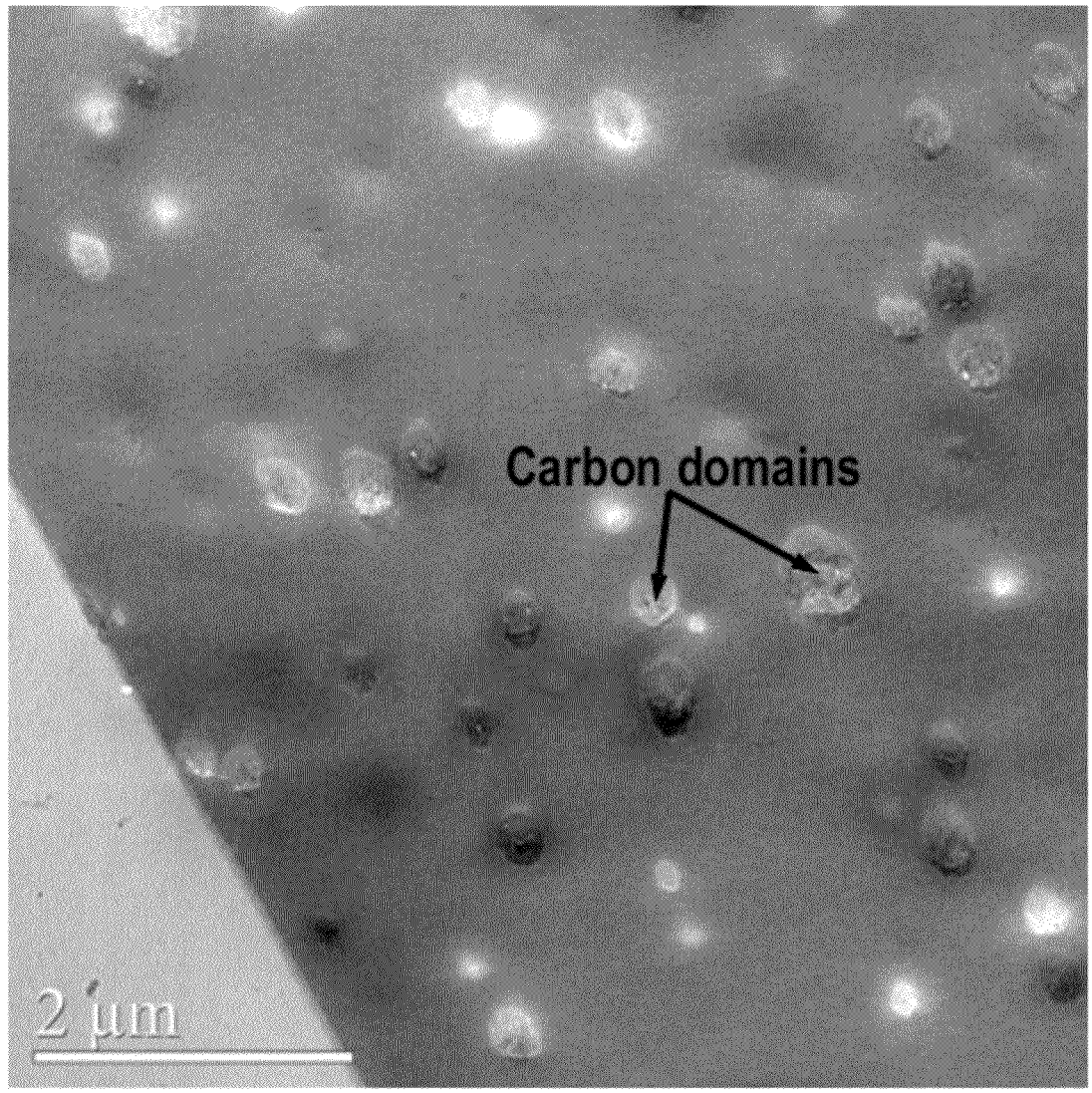
FIG. 4 shows a TEM cross-section of a cured polyimide film prepared as disclosed in Comparative Example B.

A cross section of the cured film (FIG. 4) was analyzed by TEM, which revealed a uniform distribution of carbon domains derived from PAN in the polyimide phase. The carbon domains were observed to be less than 2 microns in diameter.

Example 3

10 wt % Loading of Cellulose Acetate in PAN/Cellulosic Polymer/Polyimide Precursor Blend In this Example, 65 g of the PAA and PAN mixture prepared in Comparative Example B was mixed with 5.8 g of a 10 wt % solution of cellulose acetate dissolved in DMAc to prepare a PAN/cellulose acetate/polyimide precursor blend. The methods and procedures of Comparative Example A were followed to prepare and cure a film from the blend. The cured film was black in color. Table 1 presents the viscosity of the blend before film casting, as well as the optical density, gloss, dielectric constant, dissipation factor, and initial tear resistance of the cured film.

Figure 5:
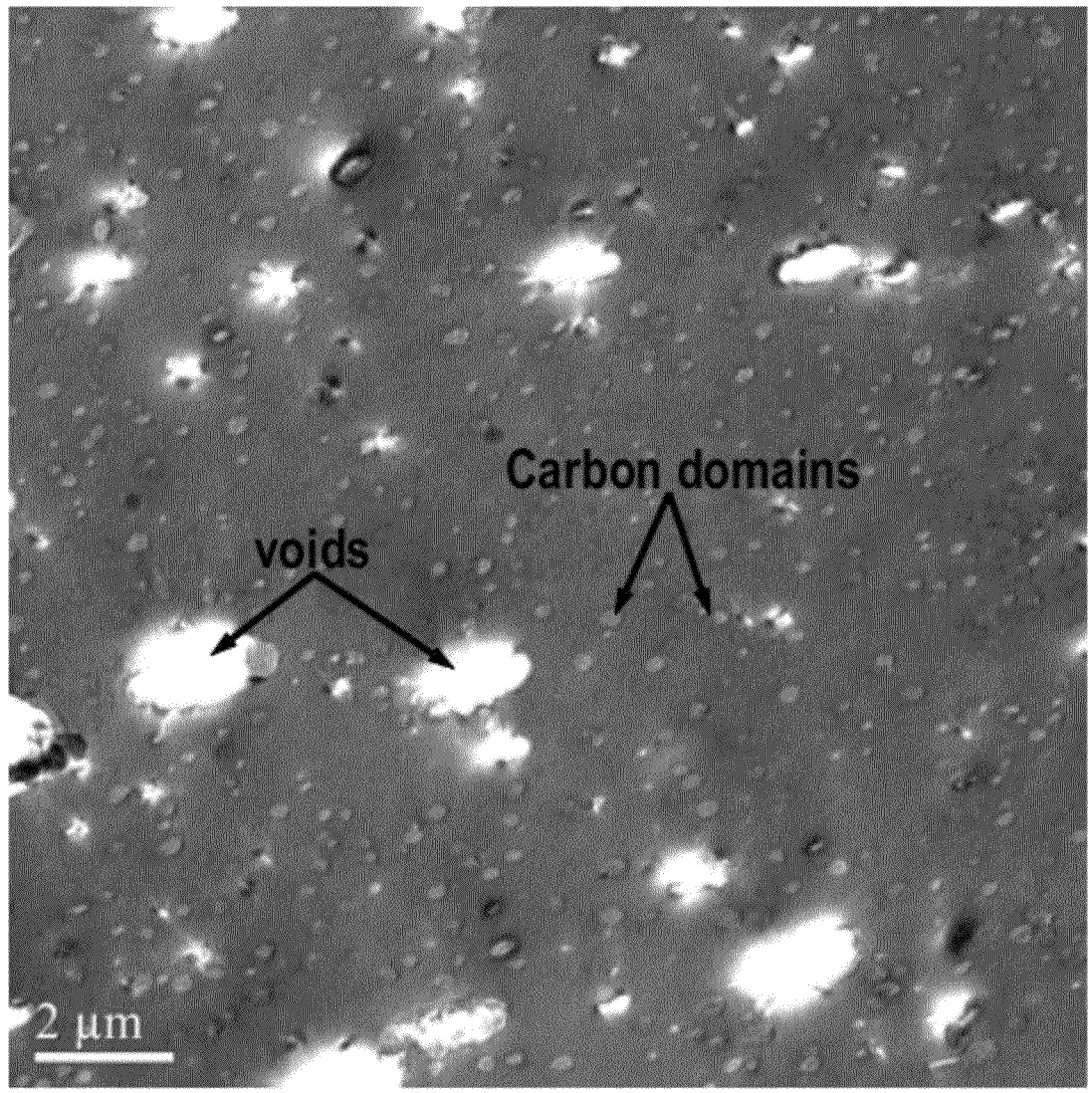
FIG. 5 shows a TEM cross-section of a cured polyimide film prepared as disclosed in Example 3.

A cross section of the cured film (FIG. 5) was analyzed by TEM, which revealed a uniform distribution of carbon domains derived from PAN and a few closed and isolated voids containing carbon and derived from cellulose acetate.

Example 4

20 wt % Loading of Cellulose Acetate in PAN/Cellulosic Polymer/Polyimide Precursor Blend In this Example, 65 g of the PAA and PAN mixture prepared in Comparative Example B was mixed with 11.1 g of a 20 wt % solution of cellulose acetate dissolved in DMAc to prepare a PAN/cellulose acetate/polyimide precursor blend. The methods and procedures of Comparative Example A were followed to prepare and cure a film from the blend. The cured film was black in color. Table 1 presents the viscosity of the blend before film casting, as well as the optical density, gloss, dielectric constant, dissipation factor, and initial tear resistance of the cured film.

Figure 6:
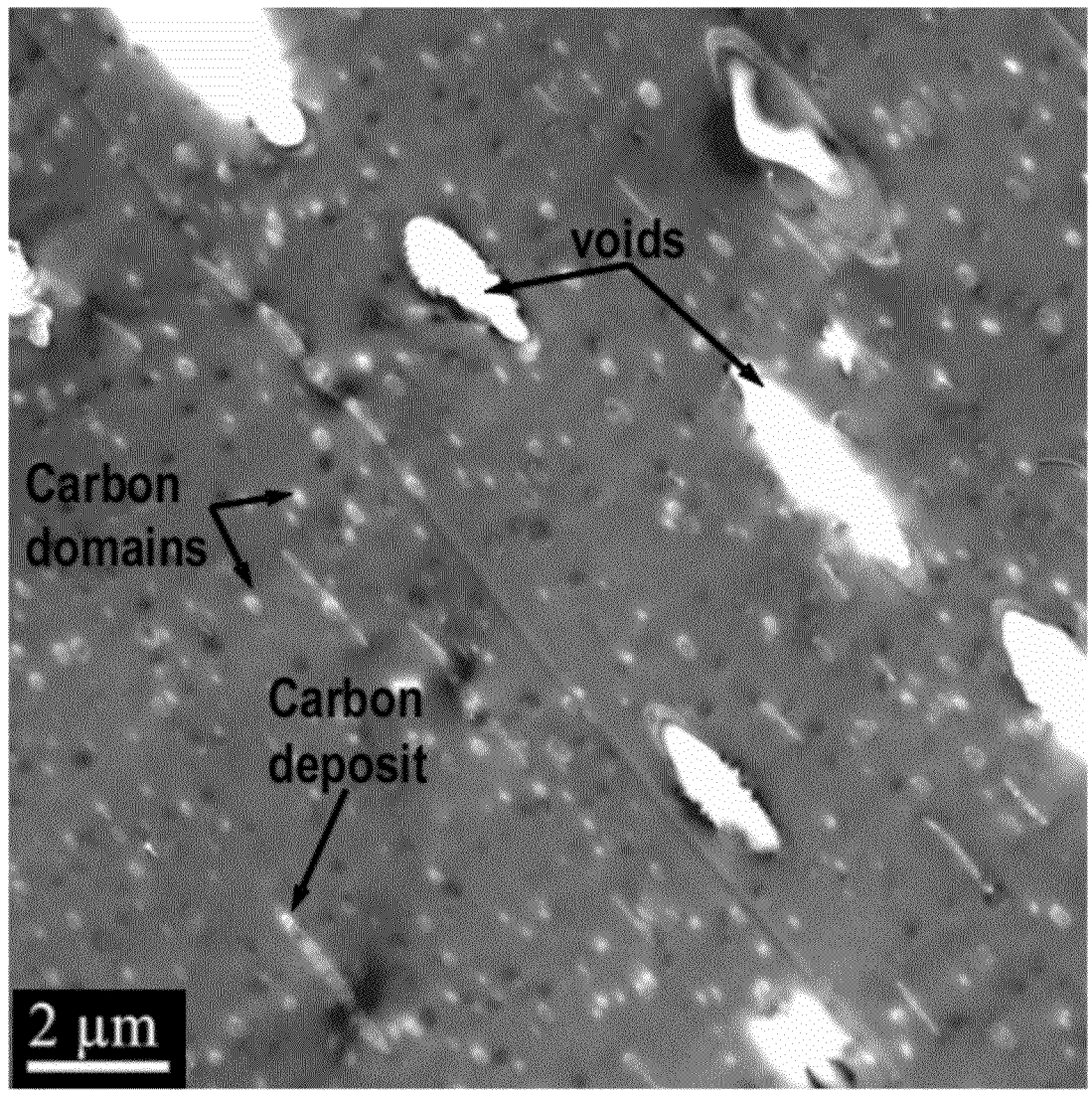
FIG. 6 shows a TEM cross-section of a cured polyimide film prepared as disclosed in Example 4.

A cross section of the cured film (FIG. 6) was analyzed by TEM, which revealed a uniform distribution of carbon domains derived from PAN in addition to the closed and isolated voids containing carbon and derived from cellulose acetate. The addition of cellulose acetate to the PAN/polyimide precursor mixture increased the optical density of the cured film by at least 2× and reduced the gloss by at least 50% compared to the optical density and gloss of the film prepared with the same amount of PAN but without cellulose acetate (Comparative Example B). The initial tear strength of the cured film decreased by about 30% compared to that of the cured film prepared without cellulose acetate (Comparative Example B).

TABLE 1

Weight Percent Loading of Polyacrylonitrile, Cellulose Acetate, and SYLOID ® C803 in Blend and Viscosity of Blend, as Well as Optical Density, Gloss, Dielectric Constant Dk, Dissipation Constant Df and Initial Tear strength of Cured Films Prepared in Examples 1-4 and Comparative Examples A and B.

| | Wt % Loading in Blend | | | Viscosity | Cured Film Properties | | | | |
|---|---|---|---|---|---|---|---|---|---|
| Example | PAN (%) | CAc (%) | SYLOID ® (%) | of Blend* (Poise) | OD (1 mil) | Gloss (60 deg) | Dk (1 kHz) | Df (1 kHz) | Tear (gf/mm) |
| Comp. A | 7.5 | 0 | 5 | 1420 | 1.9 | 57 | 4.1 | 0.02 | 30,670 |
| 1 | 7.5 | 10 | 5 | NA | 2.0 | 47 | 4.1 | 0.04 | 27,080 |
| 2 | 7.5 | 20 | 5 | NA | 2.7 | 29 | 3.8 | 0.04 | 18,600 |
| Comp. B | 7.5 | 0 | 0 | 2090 | 1.0 | 120 | 4.1 | 0.008 | 32,780 |
| 3 | 7.5 | 10 | 0 | NA | 1.8 | 90 | 3.9 | 0.02 | 24,800 |
| 4 | 7.5 | 20 | 0 | NA | 2.6 | 54 | 4.1 | 0.06 | 22,620 |

*immediately before film casting
"NA" means "not available"

The data in Table 1 show that the filled polyimide films of Examples 1 through 4, which comprise a continuous polyimide phase containing a dispersed carbon phase comprising substantially amorphous carbon domains and dispersed closed voids containing substantially amorphous carbon, have lower gloss and higher optical density than the cured films of the respective Comparative Examples, which do not contain dispersed closed voids. The data in Table 1 also show that the initial tear strength of the cured films of the Examples can be modified by the loading of cellulose acetate in the polymer blend, with higher loadings resulting in lower initial tear strength.

What is claimed is:

1. A filled polyimide film obtained by a method comprising;
   a) contacting with sufficient mixing:
      i) a solution comprising polyacrylonitrile;
      ii) a solution comprising a cellulosic polymer having an average molecular weight in the range of about 500 to about 300,000 dalton; and
      iii) a solution comprising a polyimide precursor to form a polyacrylonitrile/cellulosic polymer/polyimide precursor blend in which the polyimide precursor forms a continuous phase, the polyacrylonitrile forms a discontinuous phase consisting of polyacrylonitrile domains, and the cellulosic polymer forms a discontinuous phase consisting of cellulosic polymer domains;
   wherein:
      the polyimide precursor is derived from at least 50 mole percent of an aromatic dianhydride, based upon a total dianhydride content of the polyimide precursor, and at least 50 mole percent of an aromatic diamine based upon a total diamine content of the polyimide precursor;
      the polyacrylonitrile domains have an average size of 2 microns or less;
      the polyacrylonitrile has a loading of from about 1 weight percent to about 50 weight percent, based on the weight of the polyimide obtainable from the polyimide precursor; and
      the loading of cellulosic polymer is from about 1 weight percent to about 40 weight percent, based on the weight of the polyimide obtainable from the polyimide precursor;
   b) forming a film from the polyacrylonitrile/cellulosic polymer/polyimide precursor blend; and
   c) heating the polyacrylonitrile/cellulosic polymer/polyimide precursor blend film to a temperature of about 300° C. to about 500° C. to convert the polyacrylonitrile domains to substantially amorphous carbon domains, the cellulosic polymer domains to dispersed closed voids having an average longest dimension of about 0.1 microns to about 10 microns and containing substantially amorphous carbon, and the polyimide precursor to polyimide.

2. The filled polyimide film of claim 1, wherein the cellulosic polymer comprises microcrystalline cellulose, a cellulose ester, a cellulose ether, or a combination of two or more thereof.

3. The filled polyimide film of claim 2, wherein the cellulose ester comprises cellulose acetate, cellulose acetate butyrate, or a combination of two or more thereof.

4. The filled polyimide film of claim 1, wherein the cellulosic polymer has an average molecular weight in the range of about 5000 to about 100,000 dalton.

5. The filled polyimide film of claim 1, wherein the film is 2 to 500 microns in thickness.

6. A coverlay comprising the filled polyimide film of claim 1 and an adhesive coated on at least one side of the film.

7. The coverlay of claim 6, wherein the adhesive is selected from the group consisting of thermoplastic polyimide resins, epoxy resins, phenolic resins, melamine resins, acrylic resins, cyanate resins and combinations of two or more thereof.

8. The coverlay of claim 6, wherein the adhesive is a polyimide thermoplastic resin, optionally further comprising a thermosetting adhesive selected from epoxy resins and phenolic resins.

9. The coverlay of claim 6, wherein the adhesive is an epoxy resin selected from the group consisting of: bisphenol A epoxy resins; bisphenol F epoxy resins; bisphenol S epoxy resins; phenol novolac epoxy resins; cresol novolac epoxy resins; biphenyl epoxy resins; biphenyl aralkyl epoxy resins; aralkyl epoxy resins;
dicyclopentadiene epoxy resins; multifunctional epoxy resins; naphthalene epoxy resins; phosphorus containing epoxy resins; rubber modified epoxy resins, and mixtures of two or more thereof.

10. The filled polyimide film of claim 1, wherein the polyacrylonitrile has an average molecular weight in the range of about 10,000 to about 300,000 dalton.

11. The filled polyimide film of claim 1, wherein
a) the aromatic dianhydride is selected from the group consisting of:
pyromellitic dianhydride,
3,3',4,4'-biphenyl tetracarboxylic dianhydride,
3,3',4,4'-benzophenone tetracarboxylic dianhydride;
4,4'-oxydiphthalic anhydride,
3,3',4,4'-diphenyl sulfone tetracarboxylic dianhydride,
2,2-bis(3,4-dicarboxyphenyl) hexafluoropropane dianhydride,
Bisphenol A dianhydride, and
mixtures thereof; and
b) the aromatic diamine is selected from the group consisting of:
3,4'-oxydianiline,
1,3-bis-(4-aminophenoxy) benzene,
4,4'-oxydianiline,
1,4-diaminobenzene,
1,3-diaoinobenzene,
2,2'-bis(trifluorometh benzidene,
4,4'-diaminobiphenyl,
4,4'-diaminodiphenyl sulfide, and
mixtures thereof.

12. The filled polyimide film of claim 1, wherein the diamine is 1,4-diaminobenzene and the dianhydride is 3,3',4,4'-biphenyl tetracarboxylic dianhydride.

13. The filled polyimide film of claim 1, wherein the diamine is 4,4'-oxydianiline, and the dianhydride is pyromellitic dianhydride.

14. The filled polyimide film of claim 1, wherein the polyimide precursor is derived from: 10 to 90 mole % of 3,3',4,4'-biphenyl tetracarboxylic dianhydride; 90 to 10 mole % of pyromellitic dianhydride; 10 to 90 mole % of 1,4-diaminobenzene; and 90 to 10 mole % of 4,4'-oxydianiline.

15. The filled polyimide film of claim 1, wherein the diamine is a mixture of 1,4-diaminobenzene and 1,3-diaminobenzene, and the dianhydride is 3,3'4,4' biphenyl tetracarboxylic dianhydride.

* * * * *